United States Patent
Ries-Mueller et al.

(10) Patent No.: US 6,575,133 B2
(45) Date of Patent: Jun. 10, 2003

(54) METHOD AND ARRANGEMENT FOR MONITORING THE OPERATION OF A GAS FLOW CONTROL ELEMENT IN AN INTERNAL COMBUSTION ENGINE

(75) Inventors: Klaus Ries-Mueller, Bad Rappenau (DE); Christian Koehler, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 09/760,758

(22) Filed: Jan. 17, 2001

(65) Prior Publication Data

US 2003/0034005 A1 Feb. 20, 2003

(30) Foreign Application Priority Data

Jan. 17, 2000 (DE) .......................... 100 01 583

(51) Int. Cl.⁷ ............................... F02B 31/00
(52) U.S. Cl. ..................... 123/306; 123/308
(58) Field of Search ............... 123/306, 308, 123/436

(56) References Cited

U.S. PATENT DOCUMENTS

| | | | | |
|---|---|---|---|---|
| 4,561,389 A | * | 12/1985 | Matsumoto | 123/435 |
| 4,651,693 A | * | 3/1987 | Nakajima et al. | 123/306 |
| 4,895,125 A | * | 1/1990 | Geiger | 123/568.11 |
| 5,222,570 A | * | 6/1993 | Kawamura et al. | 180/197 |
| 5,231,869 A | | 8/1993 | Klenk et al. | |
| 5,359,518 A | | 10/1994 | Wimmer | |
| 5,861,553 A | | 1/1999 | Janetzke et al. | |
| 5,979,401 A | * | 11/1999 | Hickey | 123/306 |
| 6,402,125 B1 | * | 6/2002 | Burns et al. | 261/71 |

FOREIGN PATENT DOCUMENTS

| | | |
|---|---|---|
| DE | 4001333 | 10/1991 |
| DE | 4138765 | 7/1992 |
| DE | 198 28 279 | 12/1999 |

* cited by examiner

Primary Examiner—John Kwon
(74) Attorney, Agent, or Firm—Walter Ottesen

(57) ABSTRACT

The invention is directed to a method and an arrangement for monitoring the operation of a gas flow control element in an internal combustion engine. In this method, the engine rough running is detected and at least one rough-running signal is formed which represents the rough running of the engine. Then, by driving the gas flow control element, a change of the position of the gas flow control element is attempted. Then, a detection of the rough-running signals as a function of the change of the position of the gas flow control element takes place. The change of position is intended by the driving of the gas flow control element. From the above, a function signal can be derived which provides information as to the operation of the gas flow control element. The diagnosis of a gas flow control element by evaluation of the engine rough running in engine controls (which anyway have units for forming rough-running values) permits a diagnosis of the above kind without separate sensors for function monitoring. The method is suitable especially for monitoring the operation of swirl flaps.

9 Claims, 2 Drawing Sheets

METHOD AND ARRANGEMENT FOR MONITORING THE OPERATION OF A GAS FLOW CONTROL ELEMENT IN AN INTERNAL COMBUSTION ENGINE

FIELD OF THE INVENTION

The invention relates to a method and an arrangement for monitoring the operation of a gas flow control element including a swirl flap in an internal combustion engine.

BACKGROUND OF THE INVENTION

In multi-cylinder internal combustion engines having fuel direct injection, an optimized mixture formation or mixture distribution in the combustion chamber is sought for an optimized combustion in the combustion chambers of the individual cylinders. A decisive contribution for this purpose can be made by a suitably directed air flow into the combustion chambers. The nature and course of the air flow are significantly influenced during induction by the intake channels and the nature of the inflow of the air into the cylinders. The optimal type and the intensity of the directed air movement in the cylinder is dependent upon various factors and deviations from the optimum can lead to various problems. An air movement which is too low can, for example, lead to the following: a poor utilization of the air, an incomplete combustion or to combustion misfires. Increasing emissions of smoke can occur when the swirling of air is too intense, for example, in diesel engines. This is so because, for the same injection duration, the fuel is injected into already combusted air regions.

Since the intake channels have a defined geometry, similar air flow conditions result in conventional induction systems over the entire rpm range and for various load conditions. To optimize the air flow, and therefore to optimize the combustion, so-called swirl flaps are utilized as gas flow control elements in the intake system upstream of the cylinders. These swirl flaps are drivable movable control elements which influence the nature and intensity of the air flow into the combustion chamber and especially lead to swirling or swirl formations. The air flow can be optimized by the operating-point dependent control of swirl flaps, for example, via a stepper motor. The swirl flap position can, for example, be stored in a characteristic field of the motor control as a function of the engine rpm and of the engine load or of the charge.

For defects in the area of swirl flaps or of their control, these swirl flaps cannot optimally satisfy the provided function so that operating disturbances can occur which can be attributed to the non-optimized air flow into the cylinders. For example, and as mentioned, this can lead to incomplete combustions or combustion misfires which lead to a deterioration of the exhaust gas. The detection of defects in the region of swirl flaps and/or of their drive is therefore desirable.

Gas flow control elements can be provided also in the exhaust system of the engine, that is, downstream of the cylinders. With such control elements, the exhaust-gas counterpressure can be influenced which works back upon the combustion processes in the cylinders. These control elements are mostly referred to as exhaust-gas flaps.

SUMMARY OF THE INVENTION

It is an object of the invention to provide a cost-effectively realizable method for monitoring the operation of gas flow control elements and especially of swirl flaps in internal combustion engines. The implementation of the method in internal combustion engines, wherein the control includes units for monitoring and, if required, influencing the smooth running of the engine, can be realized without additional sensors or other hardware components.

According to a feature of the invention, a detection of the rough running of the engine is carried out while forming at least one rough-running signal representing the rough running of the engine. For checking the operability, a change of the position of the gas flow control element is attempted and/or effected by, if required, driving the gas flow control element for a short time. A detection of the rough-running signal as a function of the drive of the gas flow control element takes place, that is, as a function of the change of the position of the gas flow control element or as a function of an attempt to change the position of the gas flow control element. The rough-running signal is thus viewed especially at or near the time of driving the gas flow control element. Here, it can be especially so that no significant rough running change results, notwithstanding driving the gas flow control element. Depending upon whether, and in which way, the rough running signal changes after driving the gas flow control element, a conclusion can be drawn as to the operability of the gas flow control element, that is, whether it is driven or if there are disturbances in this region.

In view of the foregoing, the invention provides for drawing a conclusion as to the operability of the gas flow control element by monitoring the engine rough running in the context of driving a gas flow control element. This driving of the gas flow control element is carried out preferably exclusively for test purposes with the objective of a position change. Here, and, for example, in the case of a swirl flap, one proceeds from the consideration that a deteriorated combustion, as it can occur because of a defective swirl flap, leads, as a rule, also to an increase of the rough running of the engine. If now the time-dependent trace of the rough running of the engine is viewed especially in the context of the time point of the control of the swirl flap, then specific rough running changes or the absence of expected changes of the rough running are evaluated as an indication as to an intact operation of the swirl flap control or as an indication of a defect in the actuation of the swirl flap.

The same considerations apply to exhaust-gas flaps.

The term "rough running" in the context of this disclosure relates to changes in angular acceleration of the crankshaft which can occur because of the combustion processes in the individual cylinders of the engine. Accordingly, the rough running is based on torque scatterings between the cylinders of the engine. This rough running can be determined, for example, by an evaluation of the rpm fluctuations at the crankshaft (or at the camshaft).

To realize the invention, any suitable method for observing the rough running of the engine can be used. Preferred methods, which form an index for the engine rough running by evaluating rpm fluctuations, are disclosed in German patent publication 4,001,333; and U.S. Pat. Nos. 5,359,518 and 5,231,869 as well as U.S. patent application Ser. No. 07/818,884, filed Jan. 10, 1992, now abandoned (corresponds to German patent publication 4,138,765) which are incorporated herein by reference. Especially so-called segment times can be detected for evaluating the time-dependent trace of the rotational movement of the crankshaft or the camshaft. This will be explained hereinafter in connection with an embodiment.

It is known to form rough-running values (especially also by viewing segment times), inter alia, for the detection of combustion misfires as disclosed in U.S. Pat. No. 5,861,553 incorporated herein by reference. It is noted that rough-running values are also formed in systems for equalizing cylinders wherein especially the equalization or adaptation of torque contributions individual to cylinders is understood as disclosed, for example, in German patent publication 198 28 279 which is incorporated herein by reference especially with respect to the formation of rough-running values.

The term "gas flow control element" is understood to mean in the context of this disclosure each suitable control element with which the air flow into the combustion chamber of a cylinder or the flow relationships and pressure relationship downstream of the cylinder can be influenced. Control elements of this kind do not necessarily have to be tiltable or pivotable but can, for example, also be configured as slides or the like.

In an especially simply realizable embodiment, the monitoring of the operation of the gas flow control element (especially of the swirl flap) can be carried out with the aid of a difference formation between suitably formed rough-running signals. In this way, an especially rapid reacting monitoring operation is possible. Especially, at first a quasi steady-state operation of the engine can be awaited and, in this quasi steady-state operation, the rough running of the engine is detected and is utilized for the formation of a first rough-running signal. Close in time or immediately thereafter, a driving of the gas flow control element takes place with the object of changing the position of the control element. Thereafter, and by detecting the engine rough running, a second rough-running signal is formed. A rough-running difference signal is formed from the difference between the first and second rough-running signals. The amount of this difference is compared to a pregiven threshold value.

If, for example, in the case of the swirl flap diagnosis, the rough-running difference signal lies above the threshold value, then one can assume an operationally sound swirl flap because the swirl flap position has changed apparently because of the control of the swirl flap. This leads to air flow changes and therefore temporarily to an increase of rough running. If such a significant increase in rough running is determined, then a positive function signal is outputted which represents the operability of the swirl flap control.

If, in contrast, a drop below the threshold value is determined, this is evaluated as an indication of a disturbance of the function because the drive did not lead to an intended position change of the swirl flap and therefore to a temporary increase in the rough running. In the case of a suspected defect, a negative signal can be generated which represents the disturbance of function. This disturbance signal can be utilized to initiate at least one renewed control check and/or to initiate measures to remove the function disturbance.

For diagnosis, the first and the second rough-running signal can be used also in another manner and, if required, without a difference formation, for example, with the aid of other suitable mathematical functions, for forming a combination signal from which the function signal can be derived.

In another embodiment of the invention, and after driving the gas flow control element (especially the swirl flap), first an ignition angle change is effected in dependence upon the position change of the gas flow control element, before the evaluation of the rough running is continued, for example, by detecting the second rough-running signal. This variation is advantageous in spark-ignition engines and considers that, for example, a retarded ignition can occur, under circumstances, for example, because of an increase of the swirl movement of the air flow. This is compensated by the mentioned ignition angle change so that an increase of the engine rough running, which is perhaps observed after a change of the throttle flap position, cannot be attributed originally to an unfavorable ignition angle position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
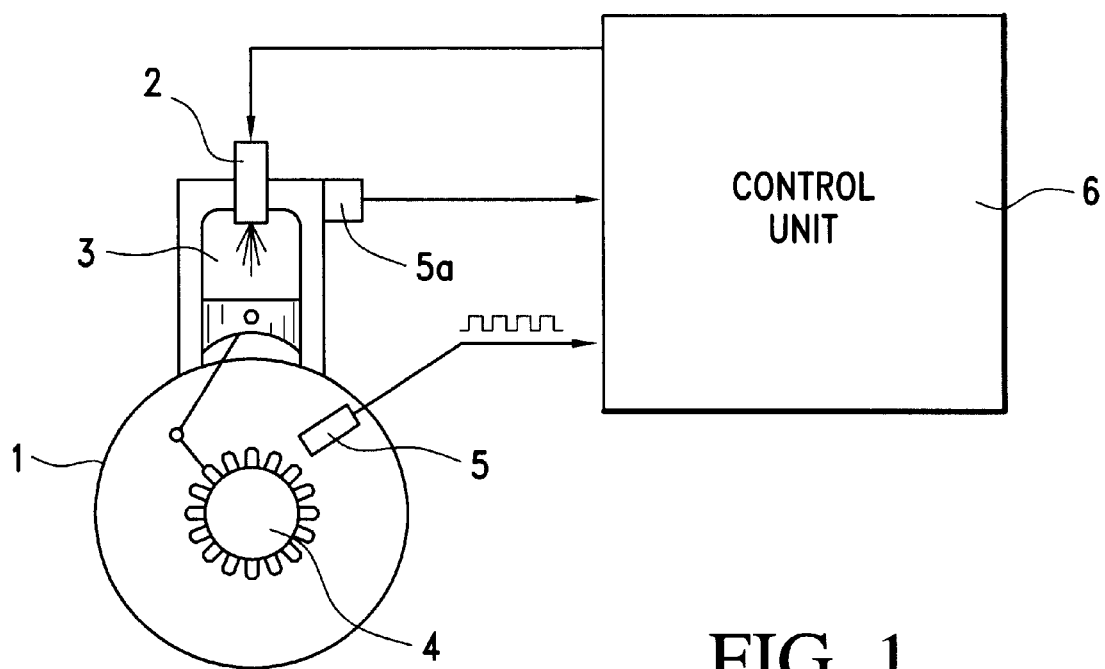
FIG. 1 is a schematic showing an internal combustion engine equipped with a gas flow control element which is monitored as to its operability in accordance with the invention.
Figure 2:
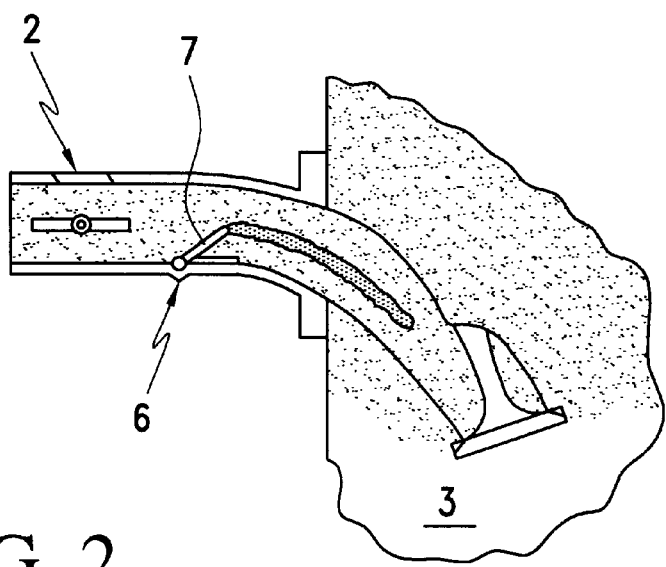
FIG. 2 is a detail schematic showing a gas flow control element whose operation is monitored in accordance with the invention; and, FIG. 3 is a flowchart showing a preferred embodiment of the method of the invention for monitoring the operation of a swirl flap.

FIGS. 1 and 2 show an arrangement for monitoring the function of a gas flow control element 7 in an internal combustion engine (1, 2, 3). The arrangement includes means (4, 5, 5a) for detecting the rough running of the engine (1, 2, 3) and for forming at least one rough-running signal representing the rough running of the engine. Furthermore, control means 6 are provided for driving the gas flow control element 7 for changing the position thereof. Here, the means (4, 5, 5a) operate additionally to detect the rough-running signal as a function of the drive of the gas flow control element 7.

Figure 3:
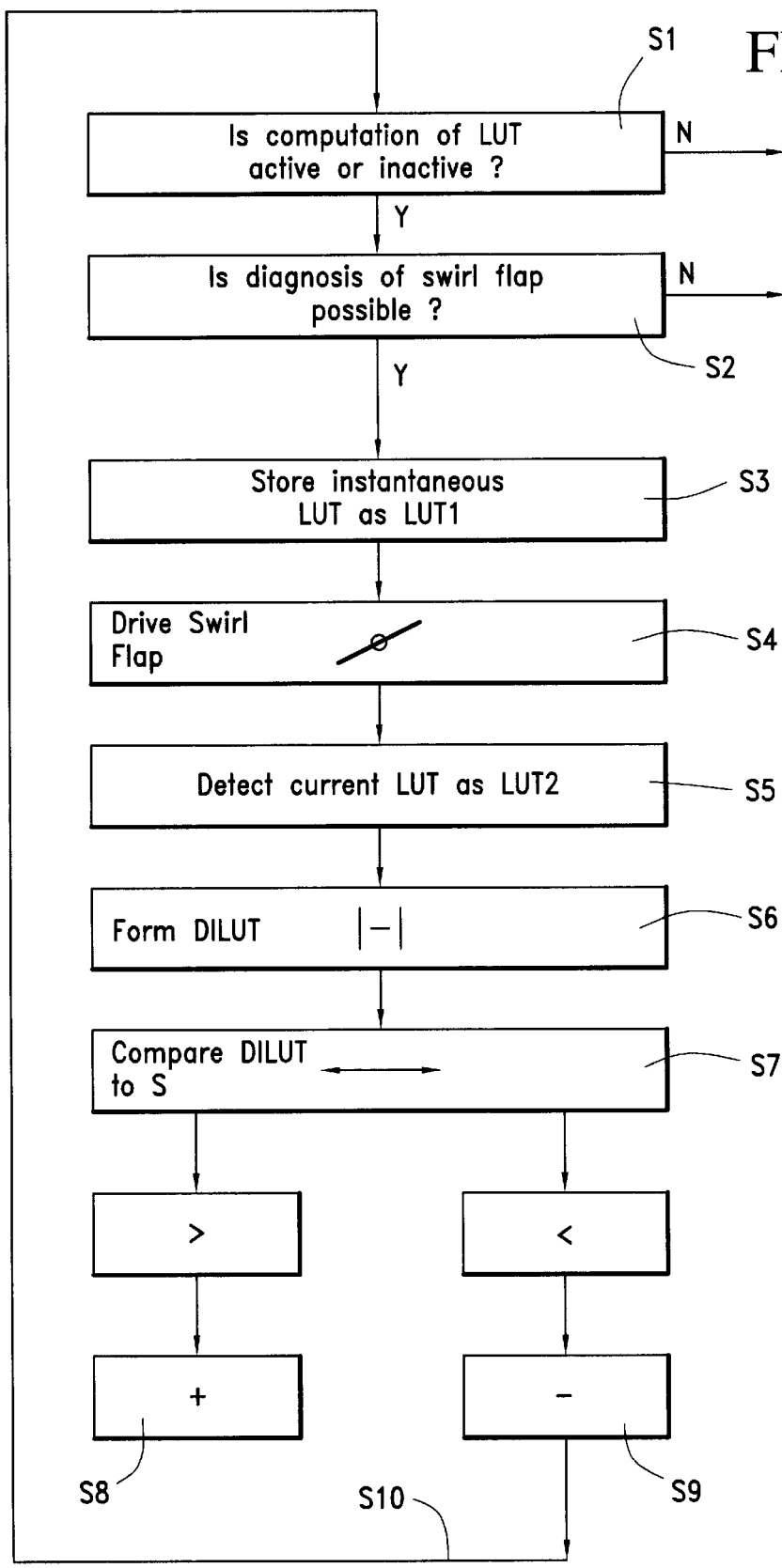

The method explained in FIG. 3 is for diagnosing a swirl flap and is implemented in the form of a suitable software and/or hardware in an electronic engine control for an internal combustion engine. The engine is, in this example, a spark-ignition engine having gasoline direct injection. In addition to other functions, the control apparatus is also configured to make available a combustion misfire detection on the basis of rough-running values of the engine. In this connection, reference can be made to U.S. Pat. No. 5,861,553 incorporated herein by reference.

The generated rough-running signals LUT represent actual angular acceleration contributions of the individual cylinders to the total torque and are detected from the evaluation of the time-dependent trace of the rotational movement of the crankshaft or camshaft with the aid of so-called segment times. Segment times are those times in which the crankshaft or camshaft passes through a predetermined angular region which is assigned to a specific cylinder. The more uniform an engine runs, the smaller are the differences between the segment times of the individual cylinders. An index for the rough running of the engine can be formed from the above-mentioned segment times.

In step S1, a determination is made as to whether the computation of the rough-running signals LUT is active or not in the control unit. If this is not the case, then an interruption of the method takes place; otherwise, in step S2, a determination is made (by observing the time-dependent trace of suitable operating variables of the engine) as to whether the instantaneous operation of the engine makes possible a swirl flap diagnosis in accordance with the invention or is suitable for this determination. In step S2, as suitable input parameters for indicating favorable operating conditions of this kind, especially such operating quantity signals can be evaluated which make possible distinguishing a quasi steady-state operation of the engine (at constant load) and a transient operation of the engine, for example, for load changes. If unfavorable conditions are present, an interruption of the diagnostic method takes place; otherwise, the method is initiated in step S3.

The initiating steps S1 and S2 offer a filter function which ensures that subsequent method steps are only then run through when significant input signals can be generated which permit a reliable diagnosis of the swirl flap.

If favorable input conditions are present, then, in step S3, a preferably digital storage of the instantaneous rough-running signal LUT takes place as a first rough-running signal LUT1 in a suitable memory unit. The instantaneous rough-running test quantity LUT for favorable operating conditions is retained for further computations.

Step S4 follows step S3 in time and a drive of the swirl flap takes place therein with the object of a change of the swirl flap position by a suitable amount, for example, by driving a stepper motor coupled to the swirl flap. The driving can, overall, take only a short time, for example, less than a second.

This swirl flap control is undertaken independently of a characteristic field supported swirl flap control exclusively for test purposes, that is, for carrying out the diagnostic method explained herein. The characteristic field supported swirl flap control is undertaken for all other operations of the engine.

In step S5, in time close to driving the swirl flap, the detection of the actual rough-running signal LUT takes place as a second rough-running signal LUT2 as well as a storage of the second rough-running signal LUT2 in a suitable memory which, for example, can already contain the signal LUT1. The actual rough-running signal LUT is made available by the rough-running detecting unit. The detection of the second rough-running signal takes place purposefully so close in time to the swirl flap control (step S4) that a possibly occurring rough-running change (especially a rough-running increase) cannot be controlled out by the engine control. This rough-running change can be attributed to a swirl flap position change.

The actual rough-running values LUT1 and LUT2, which are determined in the method steps S3 and S5 directly ahead of or directly after a drive of the swirl flap, respectively, for changing the swirl flap position serve to detect the rough-running signal as a function of the change of the position of the swirl flap and especially for the detection of a rough-running change occurring possibly as a consequence of the swirl flap position change. The change of the position of the swirl flap is intended by the drive.

In the embodiment of the method shown, a rough-running differential signal DILUT is formed in step S6 from the first rough-running signal LUT1 and the second rough-running signal LUT2. This difference signal corresponds to the amount and/or the absolute value (independent of sign) of the difference between signals LUT1 and LUT2.

In the control, for example, in a memory unit, a fixedly pregiven or pregivable threshold value S for the rough-running values is present which can define an index for a certain fluctuation of the rough-running values, which, for example, are always present because of unavoidable actual rough-running fluctuations. The threshold value S is preferably so dimensioned that unavoidable rough-running fluctuations in a substantially disturbance-free operation lie reliably below the threshold value. Then, one can presume that rough-running differences above the threshold value are based on actual physical causes which cause a deviation from the optimal combustion sequence in the engine.

The rough-running difference signal DILUT reflects the possibly occurring changes of the rough-running condition directly in connection with the drive of the swirl flap. For this reason, a comparison of the rough-running difference signal DILUT with the threshold value S (step S7) is an index for the situation as to whether the swirl flap or the swirl flap control is operational or whether defects are present in the region of the swirl flap or swirl flap control.

The result of the swirl flap diagnosis is determined in dependence upon the result of the comparison of the rough-running difference signal DILUT with the threshold value S in step S7. If there is a significant increase of the engine rough running after the swirl flap drive (step S4), then the difference signal DILUT is greater than the threshold value S. This is so because the swirl flap was moved out of its optimal position, which was determined for the actual operating point of the engine, so that the air flow into the cylinders is no longer optimal which increases the rough running of the engine. However, if the comparison in step S7 shows the result that DILUT>S, then, in step S8, a positive function signal "DK+" is outputted with the meaning that the swirl flap is O.K.

If, in contrast, the rough-running difference signal DILUT is below the threshold value notwithstanding driving the swirl flap to change the swirl flap position (step S4), then, in step S9, a negative function signal "DK–", which can be interpreted as a disturbance signal, is outputted with the meaning that the flap is defective because it can be assumed that the swirl flap could not be properly operated.

In the case of an assumed defect, that is, with the generation of the disturbance signal "DK–", the described test cycle is repeated as an answer to the (internal) disturbance signal at least one more time (especially several times, for example, a total of five times) in order to be able to reliably distinguish chance fluctuations of DILUT from actual disturbances attributed to defects (step S10). In this case (wherein the test cycle is repeated), an external disturbance signal is only outputted to the outside when, with repeated test cycles, a defect is determined and, correspondingly, a disturbance signal "DK–" (step S9) is outputted. The external disturbance signal, which is outputted to the outside, can, for example, be used for driving a warning lamp and/or be used for a corresponding entry into a diagnostic memory. With the repetition in the case of a fault (step S10), erroneous alarms can be avoided.

The method steps of the diagnosis are advantageously undertaken automatically, that is, without operator influence at specific time points and/or at specific time intervals in order to make possible a fault detection close in time to the occurrence of a defect. For example, the diagnostic method can be initiated each time when, after an engine start, the operating temperature of the engine reaches a specific value.

After ending the diagnosis, which can be completed in less than one second, the swirl flap is returned to its original position (the position before the test drive in step S4). This position change too can be used in the same manner for test purposes.

Physically, ignition takes place later when there is a higher or more intense swirl movement of the inflowing air. Because of the more intense swirl movement, the combustion takes place faster, therefore a later ignition is sufficient for the energy conversion. When, in normal operation, the swirl flap (characteristic field supported) is driven, then, normally, the ignition angle is changed as described above by the engine control. With this procedure, it is attempted to always obtain an optimal combustion by changing the ignition angle.

While considering the automatic ignition angle change, the diagnostic method can run in such a manner that, after the swirl flap is driven, an automatic change of the ignition angle corresponding to the applied values is awaited or is carried out before the detection of the second rough-running value takes place and the evaluation of the rough running is continued and ended.

This further embodiment is based, inter alia, on the following considerations. It is the case that the measuring effect (increase of the rough running when driving the swirl flap) increases when an automatic change of the ignition angle does not occur; that is, when for example, the ignition angle remains in the output position (at the start of the swirl flap displacement) and is not adjusted. If, for example, for a control or for a method with automatic ignition angle shift, the swirl is reduced, then the ignition angle would go in the direction of advance because the combustion would take longer. Because of the combustion deterioration, an increase of the certain difference (which is not too great) of the rough-running values would occur. If, in contrast, for a control or a method without automatic ignition angle shift, the swirl is reduced (for an unchanged ignition angle), then the combustion takes longer. In this way, no optimal energy conversion is possible. This leads to a clearly higher difference of the rough-running values than with the variation described having automatic ignition angle adaptation. It is therefore advantageous with a swirl flap change to shift the ignition angle so that the operation of a swirl change on the combustion quality becomes greater and thereby a higher rough running occurs because of the change of the swirl flap.

An analog method is possible for diagnosing exhaust-gas flaps, that is, such gas flow control elements which are provided downstream of the cylinders in the exhaust-gas system and via which the exhaust-gas counterpressure, for example, can be influenced in the region of the outlet valve of the cylinders.

Exhaust-gas flaps can be accommodated in the exhaust-gas system as known per se and can be, for example, electrically driven. At low engine load, the cross section of the exhaust-gas channel is reduced by partially closing the flap. In this way, the charge exchange noise is well damped. At higher load, the charge exchange noise is of subordinated significance. What is here significant is the flow noise which is generated by the gas flow. Here, the exhaust-gas flap is opened and, in this way, the flow cross section of the exhaust-gas channel is increased.

Driving the exhaust-gas flap changes the exhaust-gas counterpressure which, in turn, influences the combustion quality. The exhaust-gas counterpressure changes, for example, the internal exhaust-gas recirculation. For example, more exhaust gas flows back into the combustion chamber when, for example, there is a higher counterpressure. Correspondingly, an increase of the counterpressure can lead to an increase of the engine rough running because more exhaust gas remains in the combustion chamber or reaches the latter.

For this reason, for diagnosing the operability of the exhaust-gas flaps, one can act similarly to the described swirl flap diagnosis. Accordingly, the invention provides for observing the engine rough running in the context of a driving of the exhaust-gas flap, which is carried out exclusively for test purposes, with the objective of a position change from which a conclusion can be drawn as to the operability of the exhaust-gas flap.

The described diagnosis of the operability of swirl flaps and/or exhaust-gas flaps by evaluating the engine rough running can be implemented without building in special hardware components such as suitable sensors in each engine control which include units for determining the engine rough running and therefore for forming rough-running signals LUT. These units are often anyway present for other purposes, for example, for detecting combustion misfires and/or for cylinder equalization or the like.

It is understood that the foregoing description is that of the preferred embodiments of the invention and that various changes and modifications may be made thereto without departing from the spirit and scope of the invention as defined in the appended claims.

What is claimed is:

1. A method for monitoring the operation of a gas flow control element including a swirl flap in an internal combustion engine, the method comprising the steps of:
    detecting a rough-running signal in a quasi steady-state operating condition of said engine in advance of driving said gas flow control element to form a first rough-running signal;
    driving said gas flow control element to change the position thereof;
    detecting a rough-running signal of said engine after said gas flow control element is driven to form a second rough-running signal; and,
    forming a combination signal with said first and second rough-running signals to derive a function signal therefrom representing the operability of said gas flow control element.

2. The method of claim 1, comprising the further steps of:
    forming a rough-running difference signal with the aid of a difference between said first rough-running signal and said second rough-running signal;
    comparing the rough-running difference signal to a threshold value; and,
    forming said function signal based on the result of the comparison.

3. The method of claim 1, comprising the further step of changing the ignition angle in said engine in dependence upon said driving of said gas flow control element in advance of detecting said rough-running signal as a function of said driving of said gas flow control element.

4. The method of claim 1, comprising the further step of automatically initiating the method steps at at least one of pregivable time points and after pregivable time intervals.

5. The method of claim 1, comprising the further step of utilizing said method steps to diagnose the operability of said swirl flap by driving said swirl flap when driving said gas flow control element.

6. The method of claim 1, comprising the further step of utilizing said method steps to diagnose the operability of an exhaust-gas flap by driving at least one exhaust-gas flap of said engine when driving said gas flow control element.

7. An arrangement for monitoring the operation of a gas flow control element in an internal combustion engine, the arrangement comprising:
    first means for detecting a rough-running signal in a quasi steady-state operating condition of said engine in advance of driving said gas flow control element and to form a first rough-running signal;
    means for driving said gas flow control element to change the position thereof;

second means for detecting a rough-running signal of said engine after said gas flow control element is driven and to form a second rough-running signal; and, third means for forming a combination signal with said first and second rough-running signals to derive a function signal therefrom representing the operability of said gas flow control element.

8. The arrangement of claim 7, further comprising:

said third means functioning to carry out the following steps to form said function signal:

forming a rough-running difference signal from a difference between said first rough-running signal and said second rough-running signal; and, comparing the rough-running difference signal to a threshold value.

9. The arrangement of claim 7, wherein said gas flow control element is a swirl flap or an exhaust-gas flap of said engine.

* * * * *